Patented Oct. 2, 1951

2,569,959

UNITED STATES PATENT OFFICE 2,569,959

ACETONE-SOLUBLE UNSATURATED CO-POLYMERIZATE OF A DI-2-ALKENYL ITACONATE AND A 2-ALKENYL CHLORIDE

Pliny O. Tawney, Passaic, N. J., assignor to United States Rubber Company, New York, N. Y., a corporation of New Jersey No Drawing. Application May 21, 1948, Serial No. 28,525

5 Claims. (Cl. 260—78.5)

My invention relates to a new class of soluble, unsaturated polymeric materials prepared by the copolymerization of a di-2-alkenyl itaconate with a 2-alkenyl chloride, which copolymers in the presence of heat and/or catalyst can be converted to an insoluble, infusible state by further polymerization or by copolymerization with other polymerizable olefinic compounds.

As is well known, the polymerization of many di-2-alkenyl esters, such as diallyl itaconate, results in the formation of an insoluble gel before more than a minor proportion of the monomeric di-2-alkenyl ester has been converted to the polymeric form. The product, which usually consists of a heterogeneous mixture of insoluble polymers, unreacted monomer and some low molecular weight polymers, is difficult to manipulate in subsequent processing operations and is virtually useless in many industrial applications such as coating, laminating, impregnating and molding operations which require a soluble, fusible resin capable of ultimate conversion to a solvent and heat-resistant state. Consequently the polymers of such di-2-alkenyl esters have enjoyed but little commercial utility although the prior art has continually attempted to circumvent the above-mentioned disadvantages.

These prior art methods are essentially identical in that they all entail halting polymerization before gelation occurs in order to secure a soluble product. However, on an industrial scale, the proposed use of high reaction temperatures, polymerization inhibitors, large amounts of diluents and/or catalysts, etc. for delaying gelation, not only involves additional time and expense but actually effects only disproportionately small improvements in the yield of ungelled polymer. Hence the large amount of unreacted monomer must still be isolated and recycled for use in subsequent polymerizations, and the polymer itself must be intensively purified to remove solvents, catalyst fragments, inhibitors, gel, etc., prior to commercial use.

I have now discovered a method whereby the difficulties encountered by the prior art can be successfully overcome and a larger proportion of the di-2-alkenyl itaconate readily converted to the polymeric form without danger of premature insolubilization.

In contrast to prior art methods, the copolymerization of my invention proceeds smoothly at moderate temperatures and in the absence of solvents, inhibitors, or those special reaction conditions and precautions heretofore employed by the art in an attempt to delay or avert gelation. Moreover, the soluble, unsaturated copolymers of my invention are of uniform and homogeneous character since they are uncontaminated by the insoluble gel frequently encountered in prior art polymers of di-2-alkenyl itaconate, and hence extensive purification of my products is unnecessary.

The method of my invention comprises polymerizing the di-2-alkenyl itaconate with from 0.1 to 10 molar equivalents or higher of a 2-alkenyl chloride at temperatures in the range of 25–120° C., preferably 50–110° C. and for times sufficient to effect an adequate degree of reaction, e. g., 1 to 100 hours and usually from 1 to 70 hours.

The copolymerization reaction is promoted by a source of free radicals such as a peroxide, including organic peroxides, e. g., acetyl peroxide, benzoyl peroxide, and tert.-butyl hydroperoxide, these promoters being employed in amounts of from 0.1 to 20%, preferably 1.0–10% by weight of the reactant mixture. Any organic peroxide capable of catalyzing polymerization of unsaturated organic compounds may be used in the practice of my invention.

The di-2-alkenyl itaconates which are operable in my invention include the itaconic acid esters of 2-alkenyl alcohols having the structural formula $$(R)CH=C(R')-CH_2OH$$

where R is selected from the group consisting of hydrogen, chloromethyl, lower alkyl and phenyl, and where R' is selected from the group consisting of hydrogen, chlorine, chloromethyl, hydroxymethyl and lower alkyl, such as allyl, 2-methallyl, 2-ethallyl, 2-chloroallyl, 2-(hydroxymethyl)allyl, 2 - (chloromethyl)allyl, tiglyl, crotyl, 4-chlorocrotyl and cinnamyl alcohols. Itaconic acid esters of the 2-alkenyl alcohols containing a terminal methylene group (i. e., where R in the foregoing formula is hydrogen, R' being as just stated) are preferred, allyl and methallyl alcohols being particularly preferred.

Suitable 2-alkenyl chlorides include those having the structural formula $$(R)CH=C(R')-CH_2Cl$$
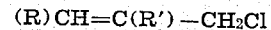

where R is selected from the group consisting of hydrogen, chloromethyl, lower alkyl and phenyl, and where R' is selected from the group consisting of hydrogen, chlorine, chloromethyl, hydroxymethyl and lower alkyl, such as allyl, 2-methallyl, 2-ethallyl, 2-chloroallyl, 2-(hydroxymethyl)allyl, 2-(chloromethyl)allyl, tiglyl, crotyl, 4-chlorocrotyl and cinnamyl chlorides. Chlorides containing a terminal methylene group (i. e., where R in the foregoing formula is hydrogen) are preferred, examples being allyl chloride, methallyl chloride, 2,3-dichloropropene (2-chloroallyl chloride) and 3-chloro-2-chloromethylpropene (2-chloromethylallyl chloride). Other 2-alkenyl halides such as methallyl fluoride, allyl bromide and allyl iodide are operable in my invention but to a lesser and varying degree, the 2-alkenyl bromides and iodides suffering the additional disadvantage of imparting poor color stability to the resulting copolymers in many cases, particularly at elevated temperatures. The chlorides are most highly preferred.

In my copending application, Serial No. 631,427, filed July 3, 1946, now U. S. Patent 2,556,989, the soluble, convertible copolymers of di-2-alkenyl itaconates and 2-alkenols are disclosed. My new copolymers are supplementary to these and provide a new group of soluble, convertible organic resins which resist burning more effectively than non-halogenated polymers and may in many cases be employed for the flameproofing of textiles, wood and other porous, flammable articles. Moreover, I have found that the 2-alkenyl chlorides are in many cases considerably more effective in securing a high conversion of the monomeric di-2-alkenyl itaconate to the soluble, polymeric form, than the corresponding 2-alkenols disclosed and claimed in the above-mentioned application.

The course of the copolymerizations of my invention can be followed by noting the increase in viscosity of the reaction mixture. The resulting copolymers can be isolated from the reaction mixtures by distilling off any unreacted starting material or by extracting them with a solvent in which the copolymers themselves are insoluble. Although it is unnecessary for many commercial applications, my products can be further purified by repeated solution in a solvent such as acetone and re-precipitation with a non-solvent, e. g., n-hexane.

indifferent to heat and are strongly resistant to attack by solvents. Suitable dyes, pigments, fillers, plasticizers, can be incorporated with my interpolymers at the soluble, fusible stage prior to the final cure.

My copolymers can also be converted to solvent and heat-resistant products by interpolymerization with polymerizable ethylenic compounds, e. g., butyl methacrylate, vinyl butyrate, styrene, allyl acrylate, and diallyl fumarate. My products dissolve readily in a number of these ethylenic compounds to yield solutions which can be totally polymerized, leaving no solvent to be evaporated. Such solutions are particularly useful for casting and laminating operations wherein the article must be pre-formed and then "set" or cured in the final shape with a minimum of shrinkage and distortion.

The following examples illustrate my invention in more detail; all parts being by weight.

*Example 1*

Mixtures of diallyl itaconate and various 2-alkenyl chlorides, together with benzoyl peroxide as polymerization catalyst, are heated at 60° C. until the point of incipient gelation is attained in each case. The reaction products are then isolated by precipitating the cooled reaction mixtures with a non-solvent, e. g., a mixture of n-hexane and diethyl ether. If desired, as for analytical purposes, further purification can be effected by solution in a solvent, e. g., acetone, and re-precipitation with a non-solvent, after which the products are dried to constant weight in vacuo. The details are summarized below in Table I including the amounts of the reactants, peroxide catalyst and polymeric product, and the reaction time to the point of incipient gelation. Also included is an example (I—a) of the polymerization of diallyl itaconate by the prior art method and in the absence of the 2-alkenyl chlorides of my invention.

TABLE I

|  | Diallyl Itaconate (parts) | 2-Alkenyl Chloride | Parts | Benzoyl Peroxide (Parts) | Reaction Time (hours) | Polymeric Product (Parts) |
|---|---|---|---|---|---|---|
| a | 100 | | | 1.14 | 1.2 | 9.7 |
| b | 100 | Allyl Chloride | 10.0 | 0.80 | 2.4 | 14.5 |
| c | 100 | do | 36.4 | 4.6 | 2.1 | 28.1 |
| d | 100 | do | 100.0 | 4.0 | 10.9 | 60.6 |
| e | 100 | Methallyl Chloride | 43.1 | 4.6 | 15.2 | 56.4 |
| f | 100 | do | 100.0 | 4.0 | 61.75 | 83.2 |
| g | 100 | 2,3-Dichloropropene | 52.8 | 6.8 | 8.6 | 73.6 |
| h | 100 | do | 100.0 | 4.0 | 29.3 | 91.8 |
| i | 100 | 3-Chloro-2-chloromethyl-propene | 59.5 | 6.9 | 10.5 | 48.0 |
| j | 100 | do | 100.0 | 4.0 | 11.25 | 62.8 |

The resulting polymeric materials can be cast or molded in a known manner to form rods, blocks and sheets. Alternatively they can be dissolved in a variety of organic solvents and employed as coating, laminating, and impregnating compositions. In the preparation of such solutions it is often unnecessary to isolate my copolymers, since higher-boiling solvents can be added directly to the crude copolymerization reaction mixture and any volatile unreacted starting materials can then be removed subsequently by fractional distillation.

Application of heat to compositions containing my unsaturated copolymers, particularly in the presence of a polymerization catalyst such as an organic peroxide, induces further polymerization and the resulting cross-linked products are quite A comparison of I—a with I—b above shows that the copolymerization of di-2-alkenyl itaconate with even a small amount of a 2-alkenyl chloride effects an increased conversion of the di-2-alkenyl itaconate to the soluble, polymeric form. Succeeding examples illustrate the increasing conversions obtainable with increasing amounts of the 2-alkenyl chloride present in the reaction mixture, and from I—f and I—h it is readily apparent that by my invention the major proportion of the di-2-alkenyl itaconate can be converted to a polymeric form without insolubilization.

*Example 2*

A mixture of equal weights of diallyl itaconate and methallyl chloride is heated at 60° C. for approximately 60 hours with 2% by weight of benzoyl peroxide. The reaction mixture is then cooled and poured into an excess of a 50:50 mixture of n-hexane and diethyl ether. The precipitated copolymer is further purified by repeated solution in acetone and re-precipitation with the ether-hexane mixture. The product, dried, in vacuo to constant weight, corresponds to a 41.6% yield of the copolymer.

Analysis: Found—Cl, 8.23%; iodine number (Wijs), 25. The chlorine analysis is that of a copolymer containing approximately 18.8% by weight of copolymerized methallyl chloride and 81.2% of diallyl itaconate.

Five parts of interpolymer are dissolved in a mixture of 4 parts of xylene and 1 part of n-butanol and poured on a glass plate. After baking at 60° C. for 20 hours the film is hard and tack-free, and upon heating for 2-3 additional hours at 150° C. it is resistant to attack by acetone and ethanol. The curing time and temperatures may be decreased by addition of 2% by weight of a catalyst such as benzoyl peroxide to the original solution.

Having thus described my invention, what I claim and desire to protect by Letters Patent is:

1. An acetone-soluble, fusible, unsaturated, binary copolymerizate of a monomeric itaconic acid di-ester of a 2-alkenyl alcohol having the formula $$(R)CH=C(R')-CH_2OH$$

where R is selected from the group consisting of hydrogen, chloromethyl, lower alkyl and phenyl and R' is selected from the group consisting of hydrogen, chlorine, chloromethyl, hydroxymethyl and lower alkyl, and a monomeric 2-alkenyl chloride having the formula $$(R)CH=C(R')-CH_2Cl$$

where R and R' are as before, the amount of said 2-alkenyl chloride being equal to from 10 to 100 parts by weight per 100 parts of said itaconic acid di-ester, said copolymerizate being capable of undergoing further polymerization to insoluble, heat-resistant form upon heating in the presence of a peroxidic polymerization catalyst.

2. An acetone-soluble, fusible, unsaturated, binary copolymerizate of monomeric diallyl itaconate and monomeric allyl chloride, the amount of said allyl chloride being equal to from 10 to 100 parts by weight per 100 parts of said diallyl itaconate, said copolymerizate being capable of undergoing further polymerization to insoluble, heat-resistant form upon heating in the presence of a peroxidic polymerization catalyst.

3. An acetone-soluble, fusible, unsaturated, binary copolymerizate of monomeric diallyl itaconate and monomeric allyl chloride in substantially equal proportions by weight, said copolymerizate being capable of undergoing further polymerization to insoluble, heat-resistant form upon heating in the presence of a peroxidic polymerization catalyst.

4. The process of making an acetone-soluble, fusible, unsaturated, binary copolymerizate which consists in heating a monomeric mixture consisting solely of a monomeric itaconic acid di-ester of a 2-alkenyl alcohol having the formula $$(R)CH=C(R')-CH_2OH$$

where R is selected from the group consisting of hydrogen, chloromethyl, lower alkyl and phenyl and R' is selected from the group consisting of hydrogen, chlorine, chloromethyl, hydroxymethyl and lower alkyl, and a monomeric 2-alkenyl chloride having the formula $$(R)CH=C(R')-CH_2Cl$$

where R and R' are as before, the amount of said 2-alkenyl chloride being equal to from 10 to 100 parts by weight per 100 parts of said itaconic acid di-ester, at a temperature of from 25° to 120° C. in the presence of a peroxidic polymerization catalyst and thereby effecting conversion of a substantially greater amount of said itaconic acid di-ester to soluble, polymeric form than would be so converted in the absence of said 2-alkenyl chloride.

5. The process of making an acetone-soluble, fusible, unsaturated copolymerizate which consists in heating a monomeric mixture consisting of a monomeric itaconic acid di-ester of a 2-alkenyl alcohol having the formula $$(R)CH=C(R')-CH_2OH$$

where R is selected from the group consisting of hydrogen chloromethyl, lower alkyl and phenyl and R' is selected from the group consisting of hydrogen, chlorine, chloromethyl, hydroxymethyl and lower alkyl, and a monomeric 2-alkenyl chloride having the formula $$(R)CH=C(R')-CH_2Cl$$

where R and R' are as before, the amount of said 2-alkenyl chloride being substantially equal by weight to the amount of said itaconic acid di-ester, at a temperature of from 25° to 120° C. in the presence of a peroxidic polymerization catalyst and thereby effecting conversion of a major proportion of said itaconic acid di-ester to the soluble, polymeric form.

PLINY O. TAWNEY.

REFERENCES CITED

The following references are of record in the file of this patent:

UNITED STATES PATENTS

| Number | Name | Date |
|---|---|---|
| 2,378,195 | D'Alelio | June 12, 1945 |
| 2,431,373 | D'Alelio | Nov. 25, 1947 |
| 2,433,616 | Marple et al. | Dec. 30, 1947 |
| 2,498,084 | Kuderna et al. | Feb. 21, 1950 |
| 2,498,099 | Tawney et al. | Feb. 21, 1950 |